United States Patent [19]
Chiu et al.

[11] Patent Number: 5,639,042
[45] Date of Patent: Jun. 17, 1997

[54] BRAKE MECHANISM FOR MAGNETIC-DRUM TAPE MACHINES

[75] Inventors: Ming-Jer Chiu, Hsinchu; Jaw-Horng Tzeng, Fungsan, both of Taiwan

[73] Assignee: Industrial Technology Research Institute, Hsinchu, Taiwan

[21] Appl. No.: 456,581

[22] Filed: Jun. 1, 1995

[51] Int. Cl.$^6$ .................................................. G11B 15/43
[52] U.S. Cl. .................... 242/354; 242/355.1; 242/356.5
[58] Field of Search .................................. 242/354, 355, 242/355.1, 356, 356.5, 356.6, 356.7; 360/96.4

[56] References Cited

U.S. PATENT DOCUMENTS

| | | | |
|---|---|---|---|
| 4,301,483 | 11/1981 | Santoro | 242/355 |
| 5,289,989 | 3/1994 | Park | 242/356 |
| 5,301,073 | 4/1994 | Katohno et al. | 242/356.5 |
| 5,347,411 | 9/1994 | Choi | 242/355.1 |
| 5,481,418 | 1/1996 | Maikuma et al. | 242/356 |
| 5,501,408 | 3/1996 | Kang et al. | 242/356.5 |

Primary Examiner—John P. Darling
Attorney, Agent, or Firm—W. Wayne Liauh

[57] ABSTRACT

An improved brake mechanism for use with magnetic-drum tape machines is disclosed. It comprises a take-up reel, a supply reel, each having a gear and a roller body, and a friction device to provide frictional force during relative rotation between the respective pair of the gear and the roller body. The supply reel has a partial cylindrical portion, and a swing gear mechanism selectively engages with the gear of the take-up reel or the supply reel. A brake plate is mounted on the swing gear mechanism; it includes an auxiliary brake and a plurality of clutch teeth. When the swing gear mechanism is engaged with the supply reel or the take-up reel, the brake plate is driven in rotation to enable the clutch teeth to engage with the gear of the take-up reel or to enable the auxiliary brake to hold against the partial cylindrical portion of the supply reel to produce a brake force, and a main brake to engage with the supply reel. The main brake, swing gear, auxiliary brake and clutch teeth cooperate to match a operating mode of said magnetic tape machine to enable said supply and the take-up reels to exhibit variable brake force so as to provide a proper back tension on the tape.

3 Claims, 11 Drawing Sheets

BRAKE MECHANISM FOR MAGNETIC-DRUM TAPE MACHINES

BACKGROUND OF THE INVENTION

This invention relates to a brake mechanism for magnetic-drum tape machines, and particularly to a brake mechanism for use in magnetic-drum tape machines which is simple in structure and space-saving. For magnetic-drum tape machines in general, a back tension has to be engaged on the tape during the process of tape LOAD, PLAY, REWIND, STOP, etc. so as to keep the tape at proper tension under various modes of operation to avoid tape distortion, breaking off, and twisting, due to looseness. Therefore a tape machine should have a brake mechanism for giving proper obstruction to the take-up reel or supply reel of the tape driving mechanism in order to cause tension on the tape. However, because the desired tension for the tape tends to be different under different modes of operation, the brake mechanism must be able to provide various braking forces.

The conventional brake mechanism is often controlled by a link mechanism and actuated by a mode control cam having a plurality of cam slots for driving the link mechanism. Because there are a number of brakes (often more than 5 sets) of the brake mechanism, the structure and action of the link mechanism have become complicated, causing complexity of the tape machine housing.

SUMMARY OF THE INVENTION

One object of the present invention is to provide a brake mechanism for magnetic-drum tape machines which is simple in structure and space-saving.

Another object of the present invention is to provide a brake mechanism for magnetic-drum tape machines which is simple in action and control mechanism.

Still another object of the present invention is to provide a brake mechanism for magnetic-drum tape machines which comprises fewer number of parts and smaller in size.

DETAILED DESCRIPTION OF PREFERRED EMBODIMENT

Figure 1:
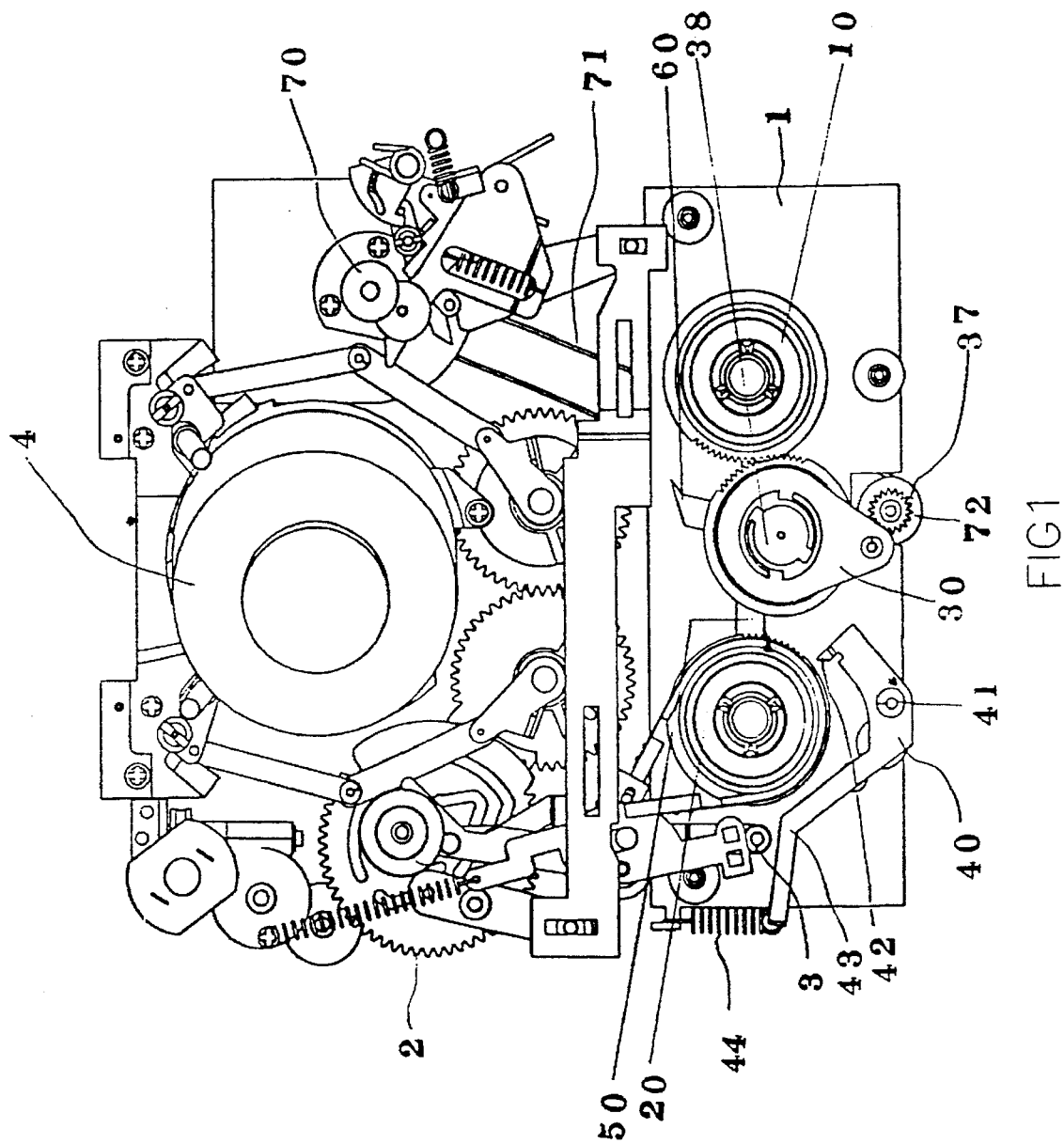
FIG. 1 is an elevational-assembly view of the present invention.
Figure 2:
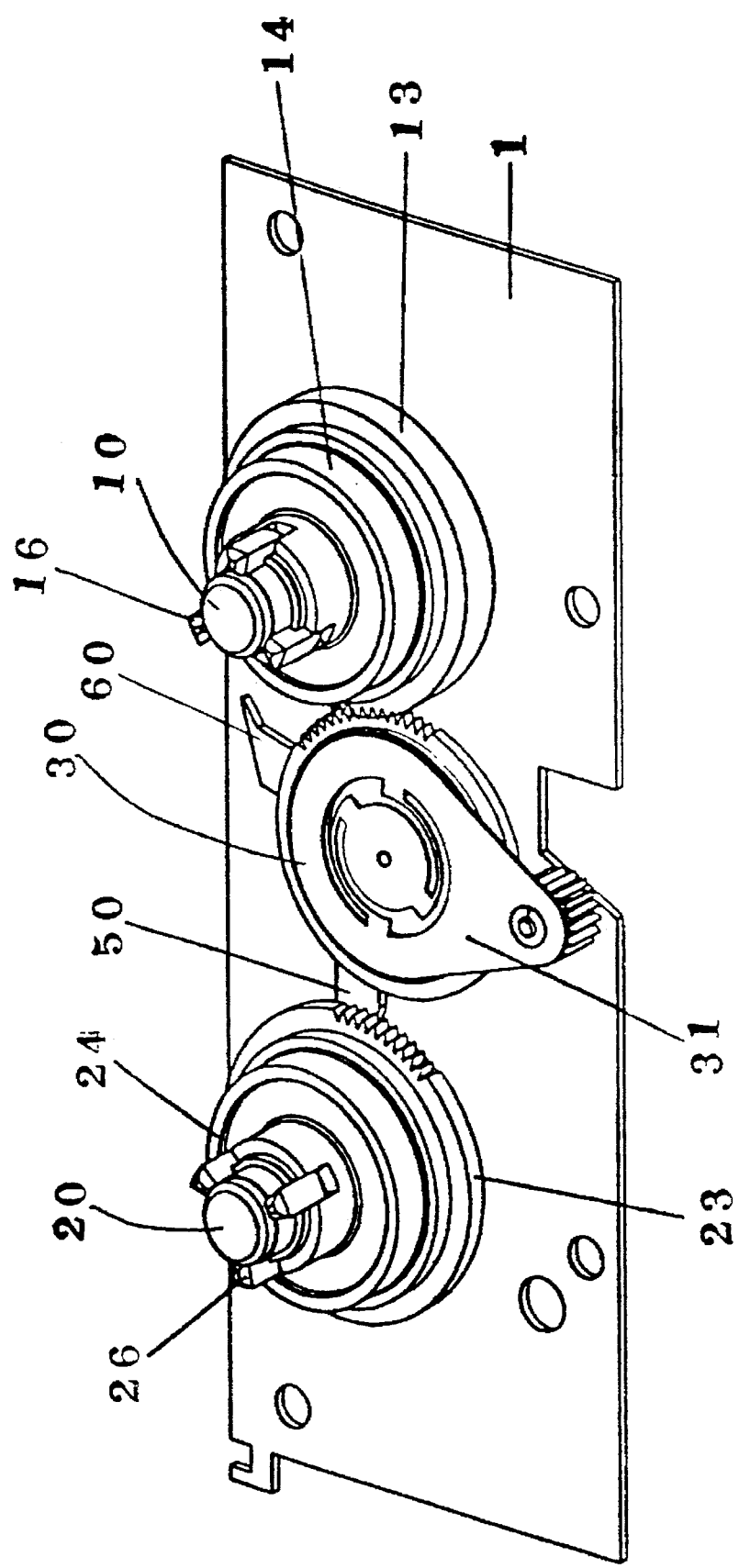
FIG. 2 is a partially-enlarged elevational view of the transmission device of the tape machine according to the present invention.

Referring to FIGS. 1, 2, the present brake mechanism for magnetic-drum tape machines comprises a drum 4, and a swing gear mechanism 30 mounted on the base plate 1 of the take-up reel 10 and supply reel 20 of the tape machine, and a main brake 40. Swing gear mechanism 30 has an auxiliary brake 50 and a clutch gear 60 wherein swing gear mechanism 30 is selectively engaged with take-up reel 10 and supply reel 20 while driving the tape in positive and negative rotation, or provides a clutch power. And when swing gear mechanism 30 is in action, it may drive auxiliary brake 50 and clutch gear 60, enabling take-up reel 10 and supply reel 20 to produce braking function.

Figure 3:
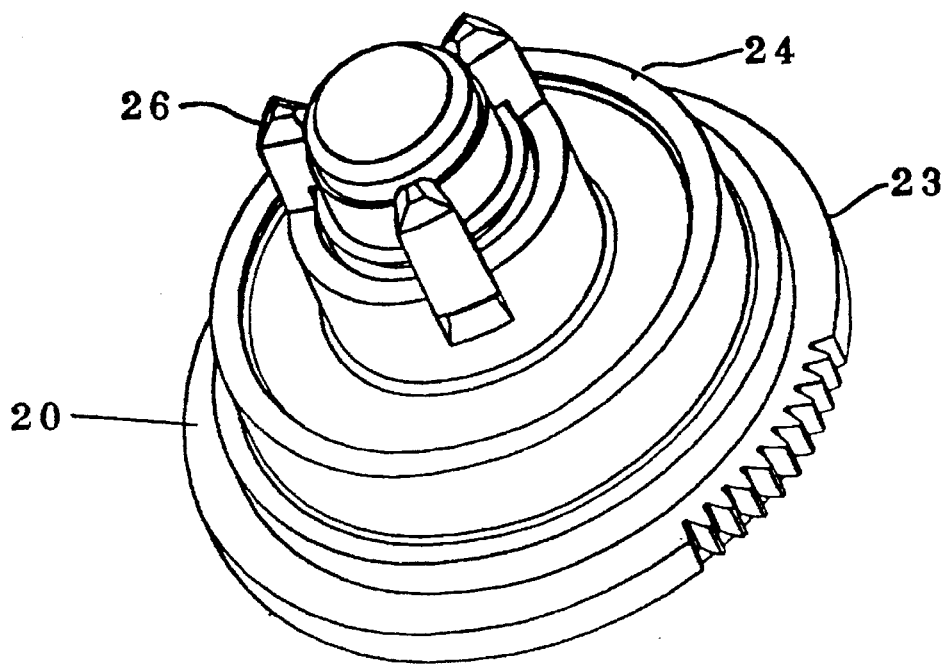
FIG. 3 is an elevational view of the supply reel of the present invention.
Figure 4:
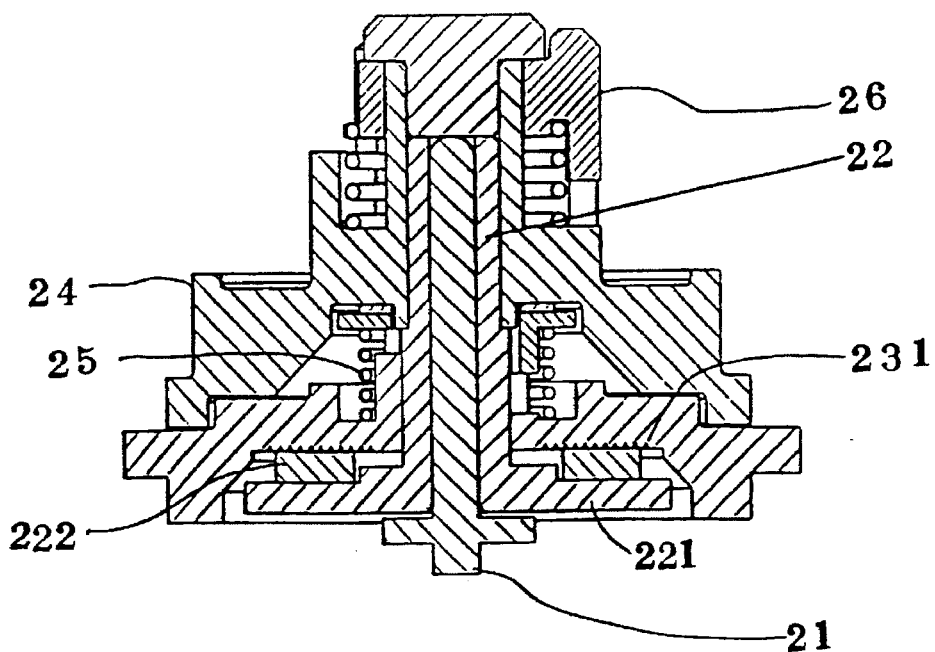
FIG. 4 is an exploded view of the supply reel of the present invention.

Referring to FIGS. 3 and 4, supply reel 20 comprises a hub 22, hub 22 being a column body with axle center vertical to base plate 1 and rotably mounted on a gear 23 thereon. The outer ring of gear 23 is tooth shaped and engaged with swing gear mechanism 30, and the bottom has a frictional plane 231. On hub 22 beneath frictional plane 231 is a flat portion 221, and on the side of flat portion 221 corresponding to frictional plane 231 is a frictional plate 222 to contact frictional plane 231 by means of frictional plate 222 so that gear 23 may drive hub 22 by means of friction.

On the bottom of gear 23 is a partial cylindrical portion 232 for contact with auxiliary brake 50 to produce a braking force (to be described later). On the upper portion is a roller body 24, roller body 24 tightly fitted with hub 22, and on the bottom is a spring 25. Spring 25 may impose pressure upon gear 23 and enable frictional plane 231 to hold against frictional plate 222 to produce a frictional force between them.

On the upper end of roller body 24 is rolling claw 26 for leading the reel of magnetic cassette tape. When gear 23 is driven by swing gear mechanism 30, gear 23 may frictionally contact the frictional plate 222 by means of the frictional plane 231 to transmit torsion to roller body 24 and rolling claw 26 through the hub 22 so as to drive the tape reel in rotation.

Except as without partial cylindrical portion take-up reel 10 is quite similar to the structure of supply reel 20, including a rolling claw 16 which is identical to rolling claw 26, so it will not be further described here.

Figure 5:
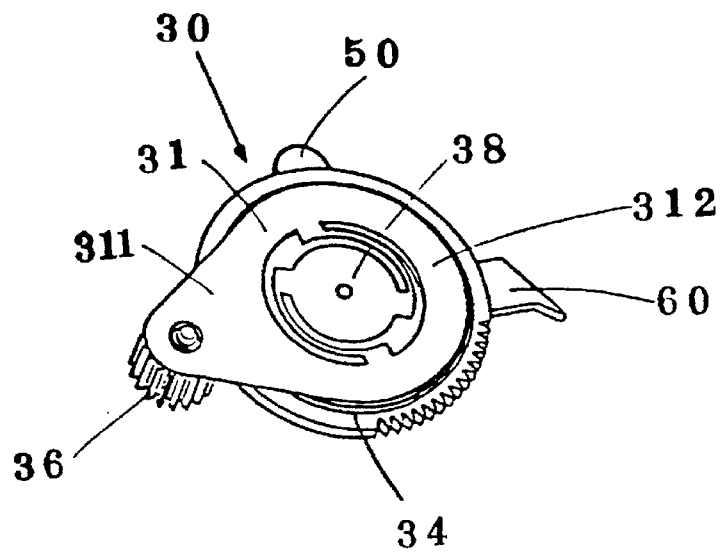
FIG. 5 is an elevational view of the swing gear mechanism of the present invention.
Figure 6:
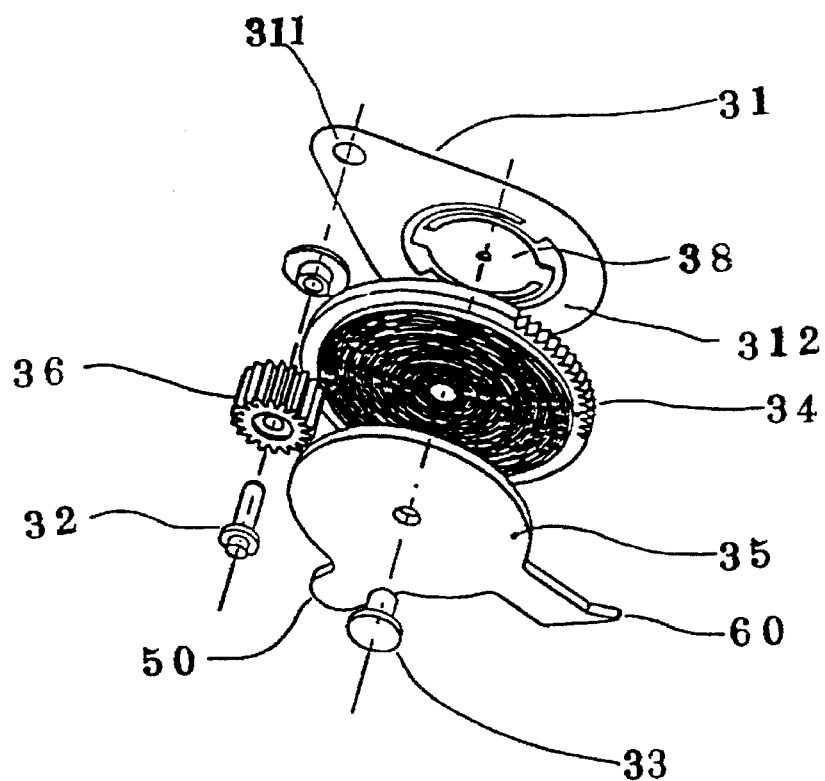
FIG. 6 is an elevational-exploded view of the swing gear mechanism of the present invention.

Referring to FIGS. 5 and 6, the present swing gear mechanism 30 has a swing arm 31. Swing arm 31 has a first end 311, and with a pin 32, it can be pivoted on base plate 1 in a rotary manner along parallel direction to base plate 1, and a second end 312 for vertically inserting a pin 33 for coaxially and rotably mounting swing gear 34 and a brake plate 35 on second end 312.

Pin 32 is cased with a hub 321 and a drive gear 36 for engaging with swing gear 34. Referring to FIG. 1, drive gear 36 may engage with transmission gear 37. Transmission gear 37 can be driven, via driving pulley 72, by the belt 71, which is driven by capstan motor 70 while enabling the swing gear 34 of drive gear 36 to rotate.

On the second end 312 of swing arm 31 is a sheet spring 38 for imposing resilience upon swing gear 34 to cause frictional force among swing gear 34, swing arm 31, and brake plate 35. Owing to the function of frictional force, when swing gear 34 is driven by drive gear 36, initially it will not produce relative rotation with swing arm 31 but will move around drive gear 36 along the same direction as the rotation of drive gear 36 so that swing arm 31 will swing around pin 32.

Figure 7:
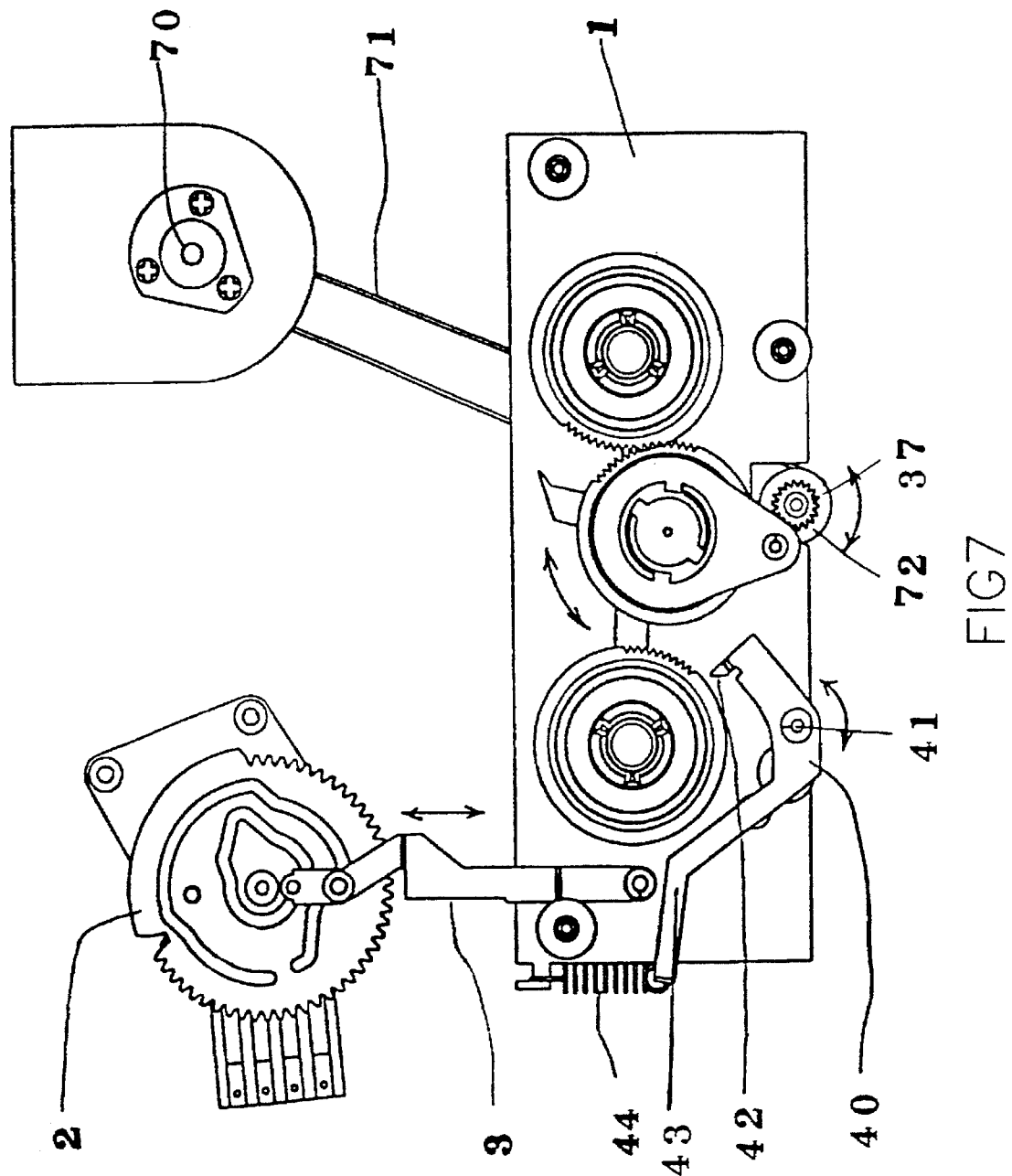
FIG. 7 is a flat view of the transmission mechanism and brake mechanism of the present invention.

Referring to FIG. 7, swing gear mechanism is mounted on swing arm 31 for swinging to the right and left. Swing gear 34 may move to the first and second positions respectively for engaging with supply reel 20 and take-up reel 10.

When swing gear 34 is swinging to engage with gears 13, 23 of take-up reel 10 or supply reel 20, it will be interrupted to stop moving around drive gear 36 while moving around pin 32, whereby it has become the first idle gear between drive gear 36 and take-up reel 10 or gears 13, 23 of supply reel while enabling take-up reel 10 or supply reel 20 to be driven in rotation.

Figure 8:
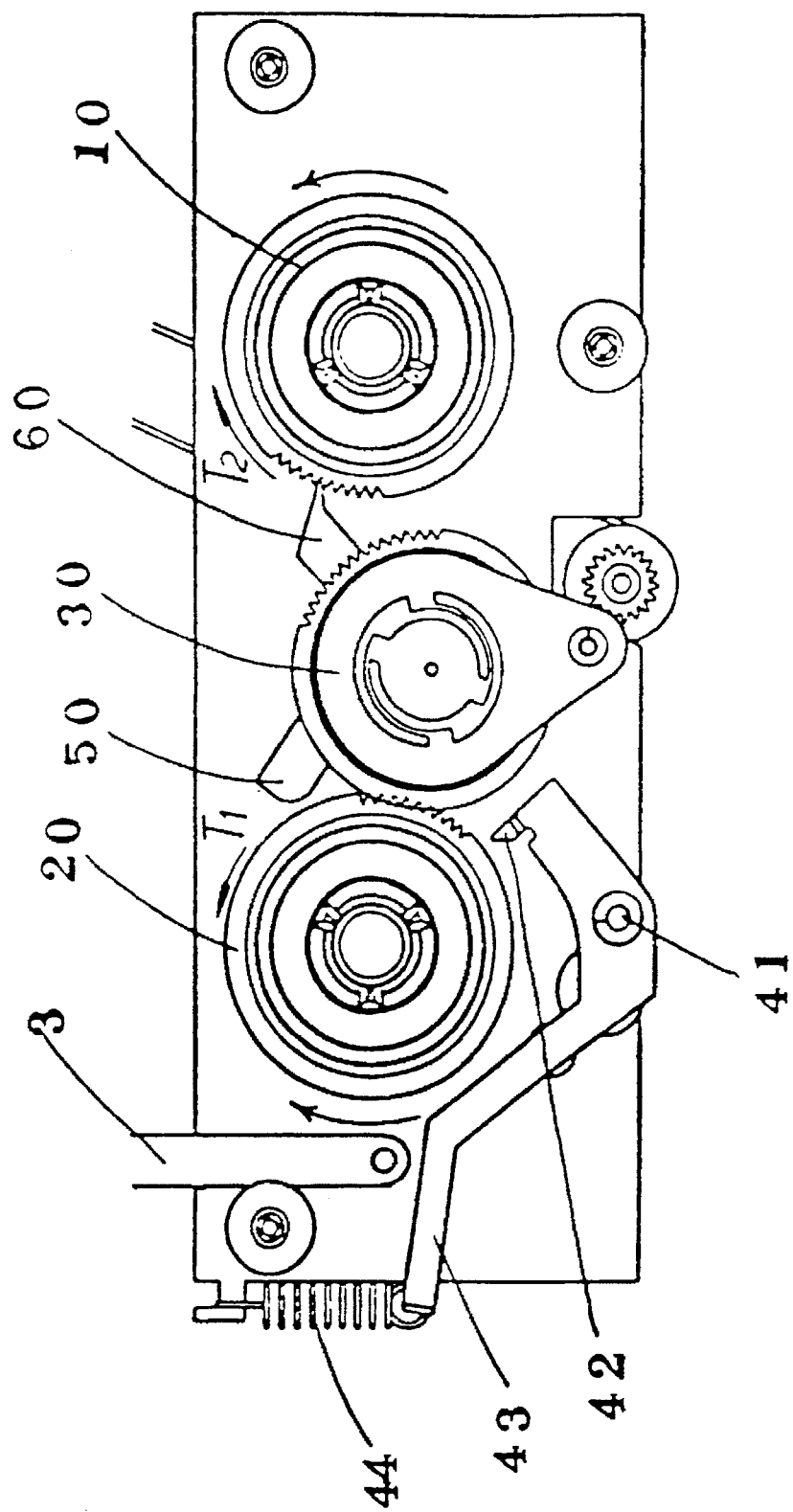
FIG. 8 is a diagrammatic view showing the first embodiment of the brake mechanism under LOAD mode.
Figure 9:
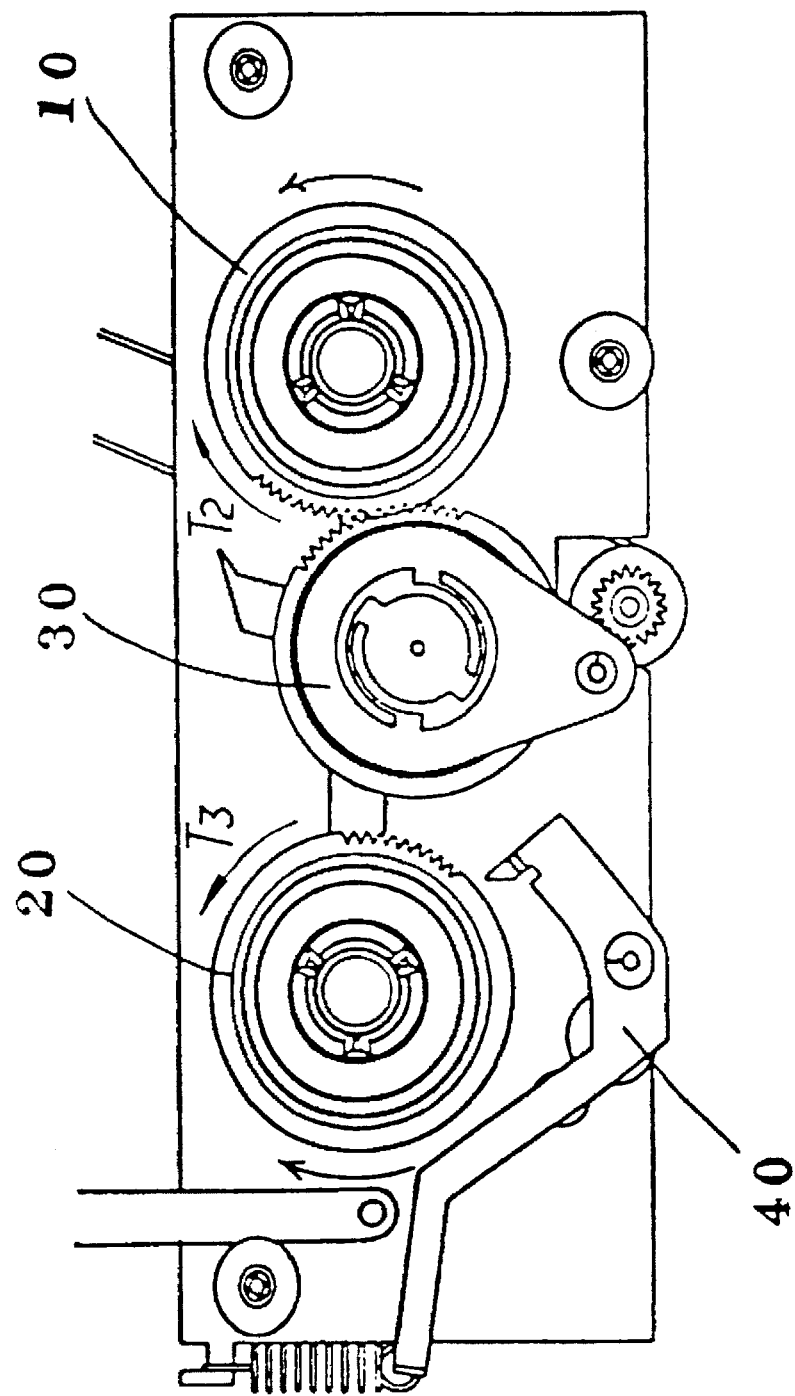
FIG. 9 is a diagrammatic view showing the second embodiment of the brake mechanism under LOAD mode.

Referring to FIG. 6, brake plate 35 is lapping with swing gear 34 and there has proper frictional force between the both so that when swing gear 34 is in rotation, it may drive brake plate 35 in rotation. Brake plate 35 has clutch tooth 60 near take-up reel 10 while auxiliary brake 50 is near supply reel 20. Referring to FIG. 9, auxiliary brake 50 will be driven by swing gear 34, when swing gear 34 engages with the gear 13 of take-up reel 10, to move around pin 33 while enabling the end to hold against the partial cylindrical portion 232 of supply reel 20 and therefore to produce a frictional resistance. Referring to FIG. 8, when swing gear 34 engages with supply reel 20 for rotation, brake plate 35 will turn along the direction that swing gear 34 is in rotation while enabling clutch tooth 60 to swing to the position of engaging with the gear 13 of take-up reel 10.

Referring to FIG. 7, the present magnetic tape machine further includes a main brake 40 for locking up the gear 23 of supply reel 20 when the tape machine stops. Main brake 40 is pivoted on base plate 1 by means of a pin 41, where on the front end has a clutch claw 42, and the other end has a link 43. On the end of link 43 between base plate 1 is a spring 44 for leading link 43, enabling the clutch claw 42 in front of main brake 40 to keep separative with the gear 23 of supply reel 20. The action of main brake 40 is controlled by mode cam 2 and link 3. Link 3 can be driven by mode cam 2 for pushing up the link 43 of main brake, enabling main brake 40 to swing and clutch claw 42 to stick in the gear 23 of supply reel 20.

Figure 11:
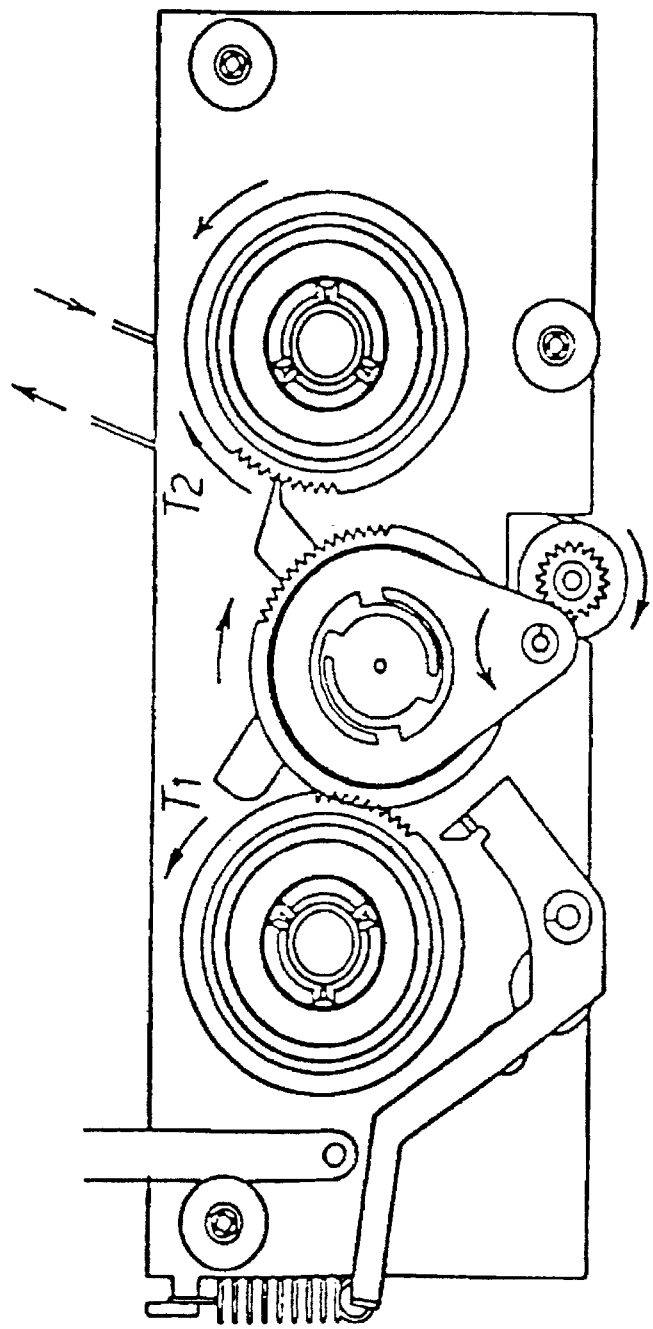
FIG. 11 is a diagrammatic view showing the action of the brake mechanism under REWIND mode.
Figure 13:
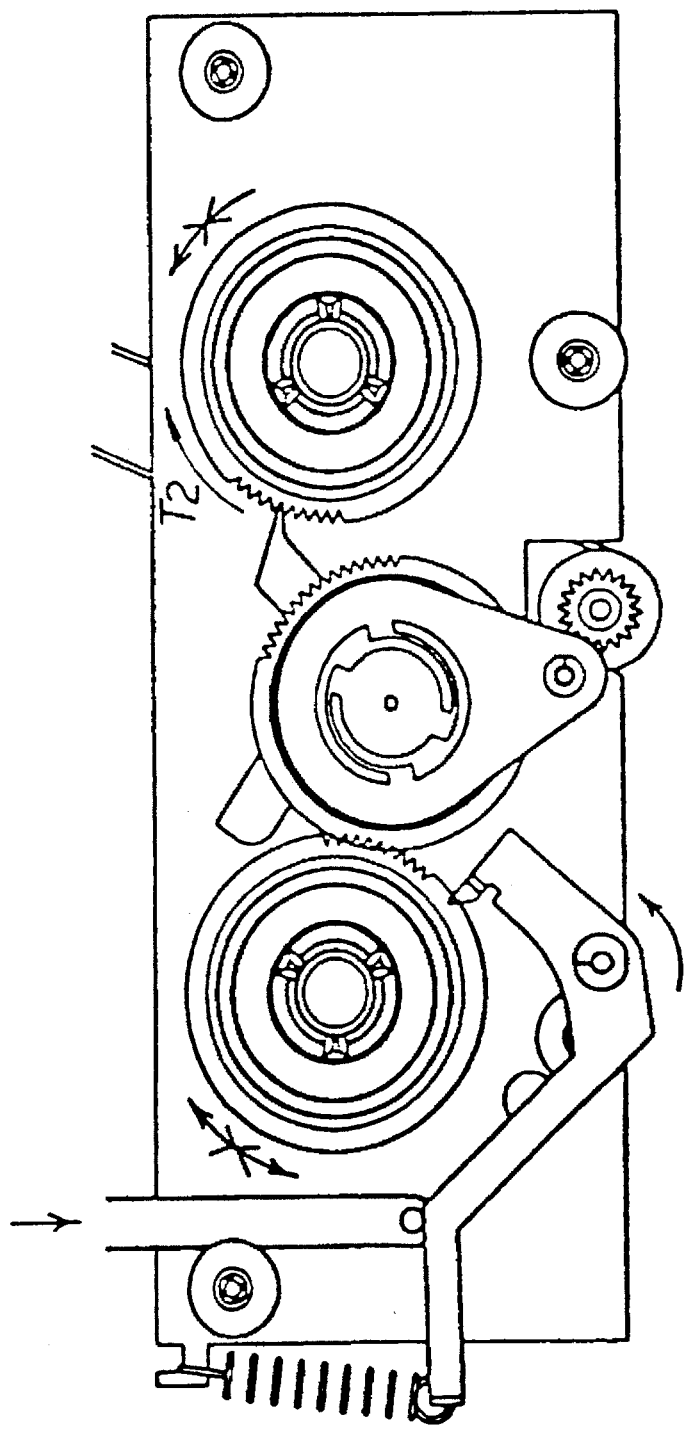
FIG. 13 is a diagrammatic view showing the second embodiment of the brake mechanism under STOP mode.

Referring to FIGS. 8 thru 13, there are various means of braking available by the present brake mechanism as follows:

(1) Referring to FIGS. 8, 11, and 13, with swing gear 34 or main brake 40 engaged with the gear 23 of supply reel 20 it can not rotate. When roller body 24 is forced in rotation, the frictional force between the frictional plate on the hub 22 of supply reel 20 and the frictional plane 231 of gear 23 will give a brake force T1 to roller body 24 in rotation.

(2) Referring to FIGS. 8, 11, and 13, with clutch tooth 60 engaged with take-up reel 10, the gear 13 cannot be in rotation whereby a frictional force will impose a brake force T2 upon roller body 14.

Figure 10:
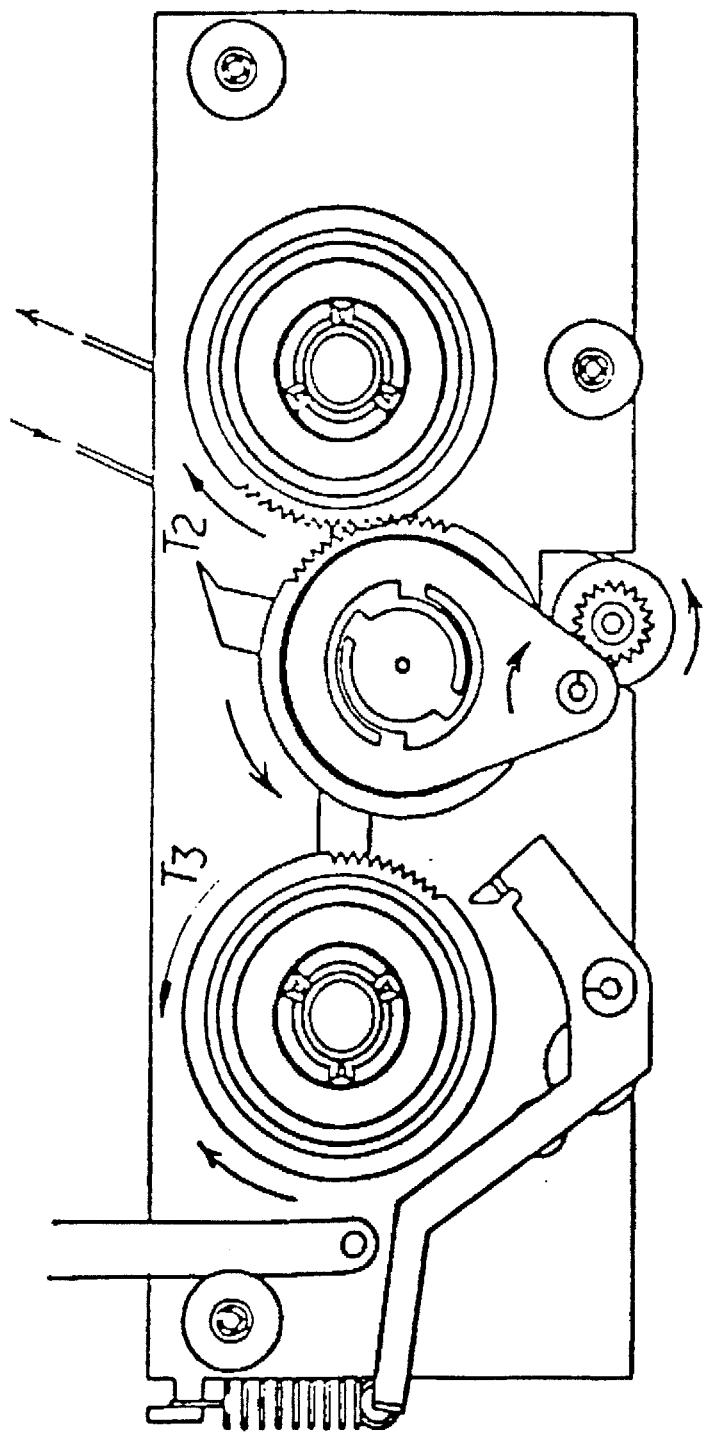
FIG. 10 is a diagrammatic view showing the action of the brake mechanism under PLAY mode.

(3) Referring to FIGS. 9 and 10, with auxiliary brake 50 in contact with the partial cylindrical portion 232 of supply reel 20, frictional force between auxiliary brake 50 and partial cylindrical portion 232 may provide a brake force T3.

Referring to FIG. 8, when the magnetic tape machine is ready for LOAD tape, capstan motor 70 will run clockwise or drive swing gear mechanism 30 to swing toward supply reel 10 and enable swing gear 34 to engage with gear 13 to rotate clockwise at some distance to lead the clutch tooth on brake plate 35 to engage with the gear 23 of supply reel 20 and then stops rotation. Because gears 13 and 23 cannot rotate, LOAD mechanism will pull the tape out of the cassette for winding around the magnetic drum 4. If brake force T1 is smaller than T2, the reel of the cassette may drive the roller body 24 of supply reel 20 and gear 23 to produce relative rotation, and brake force T1 will become back tension of LOAD. If brake force T2 is smaller than T1, LOAD will drive the reel body 14 of take-up reel 10 whereby brake force T2 becomes back tension of LOAD.

FIG. 9 shows another way of braking for LOAD, whereby the capstan motor 70 will be running counterclockwise and enabling swing gear 34 to engage with the gear 13 and the auxiliary brake 50 to contact the partial cylindrical portion 232 of supply reel 20, and capstan motor 70 stops running. If brake force T3 of auxiliary brake 50 and partial cylindrical portion 232 is smaller than the brake force T2, the tape will be pulled out by LOAD mechanism to drive supply reel 20 in rotation, and brake force T3 becomes back tension. On the contrary, the tape will drive take-up reel 10 in rotation and brake force T2 as back tension.

Referring to FIG. 10, under PLAY or FORWARD mode, swing gear mechanism 30 engages with the gear 13 of take-up reel 10 and continues to be driven by capstan motor 70 while leading take-up reel 10, and auxiliary brake 50 will hold against the partial cylindrical portion 232 of supply reel 20, enabling supply reel 20 to be trailed to produce a resistance T3 and to allow the tape with back tension.

Referring to FIG. 11, under REVERSE mode, swing gear mechanism 30 engages with supply reel 20 and leads supply reel 20 in reverse rotation while trailing the tape in a negative way, then the tape drives roller body 14 of take-up reel 10 in negative rotation. And clutch tooth 60 engages with the gear 13 of take-up reel 10, enabling gear 13 not to rotate whereby roller body 14 will produce relative rotation to the gear 13 and to produce back tension T2 when roller body 14 is trailed by the tape.

Figure 12:
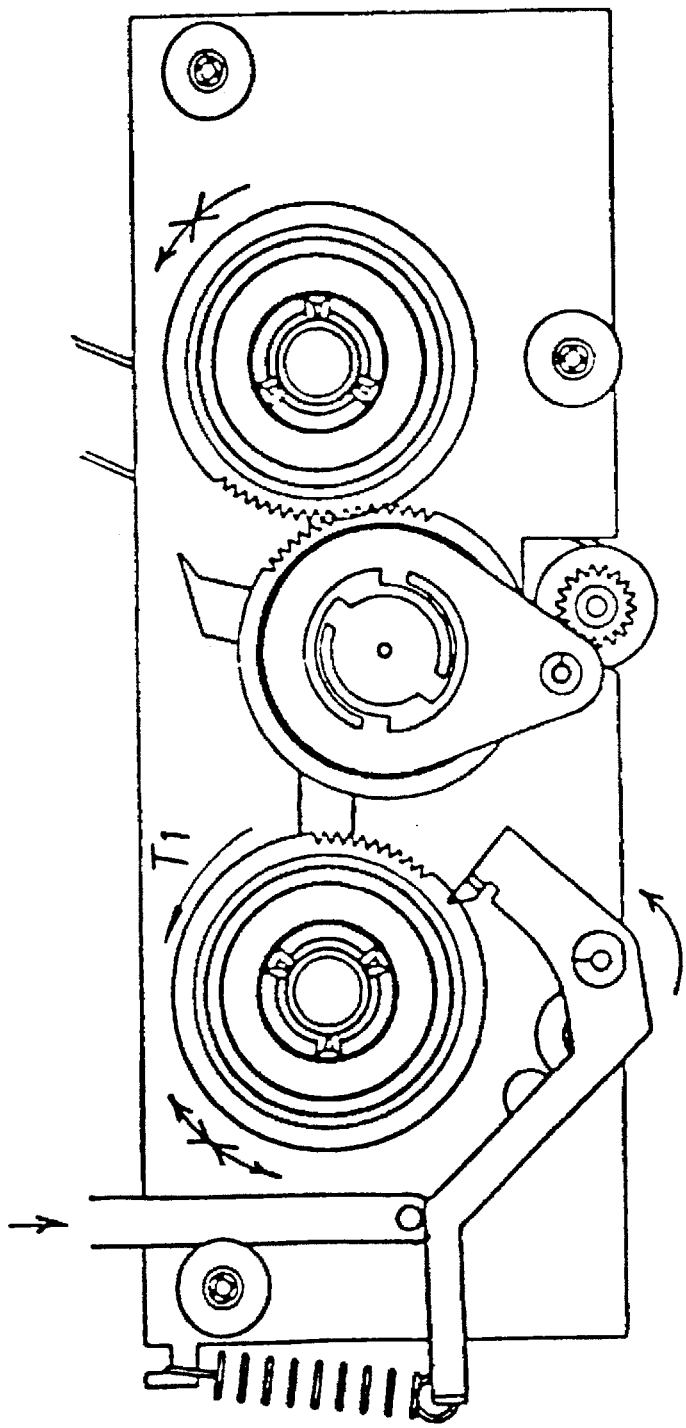
FIG. 12 is a diagrammatic view showing the first embodiment of the brake mechanism under STOP mode.

Referring to FIGS. 12 and 13, under STOP mode, the mode cam 2 drives the link 3 to push up main brake 40 whereby clutch claw 42 engages with the gear 23 of supply reel 20 and supply reel 20 thus cannot move around. Before STOP mode, if the tape machine is on PLAY mode, swing gear mechanism 30 engages with take-up reel 10, and when capstan motor 70 stops running, take-up reel 10 is thus locked up (FIG. 12). If tape machine is on REVERSE mode, before STOP mode, the clutch tooth 60 of swing gear mechanism engages with take-up reel 10 while locking up take-up reel 10 (FIG. 13). The brake force T1, T2 of supply reel 20 and take-up reel 10 will produce back tension for taking up the tape to avoid slacking.

Compared to the conventional brake mechanism, the present invention has a simplified structure of control mechanism since main brake 40 is controlled by a link mechanism while other braking actions are totally controlled by capstan motor 70 and swing gear mechanisms, and it may save a large amount of space for layout.

Further, the conventional tape brake mechanism used to have one brake mechanism on each side of the supply reel and take-up reel while the present invention has only one main brake 40 and auxiliary brake 50 and clutch tooth 60 on brake plate 35 which may accomplish all the brake action. Further, with less parts and in combination with the drive mechanism of the tape reel, it saves space and simplifies the structure.

We claim:

1. A brake mechanism for use in a magnetic-drum tape machine including:

a first reel having a first pivot vertically mounted on a base plate of said magnetic tape machine; a first gear rotably mounted on said pivot; a first roller body coaxially and rotably fitted to said pivot with said first gear; a first frictional device for providing a frictional force between said first gear and first roller body such that, when said first gear is in rotation, said frictional device drives said first roller body in rotation to produce a braking force between said first gear and said first roller body;

a second reel including: a second pivot mounted on said base plate of said magnetic tape machine parallel to said first pivot; a second gear rotably mounted on said second pivot, said second gear having a partial cylindrical portion; a second roller body for mounting a reel of cassette tape; and a second frictional device for producing a frictional force between said second roller body and said second gear and a braking force during relative rotation between said second gear and second roller body;

a capstan motor;

a swing gear mechanism mounted between said first and second reels, including: a drive gear driven by said capstan motor in rotation; a swing arm having a first end and second end, said first end having a pin swingingly pivoted on said base plate, a transmission gear rotably mounted on said pin for engaging with said drive gear; a swing gear pivotally affixed to said second end for engaging with said transmission gear, and selectively engaging with either said first gear or said second gear in accordance with a position of said swing arm; and a second frictional device for provide a frictional force between said swing gear and swing arm;

said transmission gear is driven by said drive gear in rotation, first said swing arm is driven in rotation to enable said swing gear to selectively engage with either said first gear or second gear and, then said swing gear is in rotation opposite said transmission gear;

a brake plate coaxially mounted with said swing gear on said second end of said swing arm, and a third frictional means to provide a frictional force between said brake plate said swing gear so as to enable said swing gear to drive said brake plate in rotation;

said brake plate having: a clutch tooth to engage with said first gear when said swing gear is engaged with said second gear; an auxiliary brake for holding against said partial cylindrical portion of said second reel when said swing gear is engaged with said first gear; a main brake for locking up said second reel by engaging with said second gear when said magnetic tape machine is at STOP mode;

whereby said main brake, said swing gear, said auxiliary brake and said clutch tooth cooperate to match a operating mode of said magnetic tape machine to enable said first and second reels to exhibit variable brake force so as to provide a desired back tension on the tape.

2. The brake mechanism for use in a magnetic-drum tape machine as claimed in claim 1 wherein said swing arm has a spring in contact with said swing gear for imposing a resilience upon said swing gear to produce a frictional force between swing gear and said swing arm.

3. The brake mechanism for use in a magnetic-drum tape machine as claimed in claim 1 wherein the first and second frictional devices of said first and second reel include: two frictional plates respectively mounted on said first and second reels between the axial contact planes of said first and second gears; and two springs respectively for imposing resilience upon said first and second roller bodies to produce frictional forces between said first and second roller bodies and said two frictional plates, respectively.

* * * * *